United States Patent
Von Nordenskjöld

(10) Patent No.: US 6,395,173 B1
(45) Date of Patent: May 28, 2002

(54) METHOD AND DEVICE FOR BIOLOGICALLY TREATING A FLUID CHARGED WITH ORGANIC MATERIALS WHILST PRODUCING BIOGAS

(76) Inventor: Reinhart Von Nordenskjöld, Killistrasse 3, D-85658, Egmating-Münster (DE)

(*) Notice: Subject to any disclaimer, the term of this patent is extended or adjusted under 35 U.S.C. 154(b) by 0 days.

(21) Appl. No.: 09/601,445

(22) PCT Filed: Jan. 28, 1999

(86) PCT No.: PCT/EP99/00551
§ 371 (c)(1),
(2), (4) Date: Sep. 27, 2000

(87) PCT Pub. No.: WO99/38812
PCT Pub. Date: Aug. 5, 1999

(30) Foreign Application Priority Data

Feb. 2, 1998 (DE) .......................... 198 04 007

(51) Int. Cl.⁷ .................................. C02F 3/30
(52) U.S. Cl. .................. 210/603; 210/605; 210/623; 210/629; 210/631; 210/170; 210/175; 210/195.3; 210/202; 210/205; 210/221.2; 210/513
(58) Field of Search ................. 210/603, 605, 210/610, 612, 613, 623, 631, 629, 175, 180, 195.3, 198.1, 202, 205, 220, 221.1, 221.2, 259, 513, 170, 206, 260

(56) References Cited

U.S. PATENT DOCUMENTS

| | | | |
|---|---|---|---|
| 4,022,665 A | * | 5/1977 | Ghosh et al. |
| 4,100,023 A | | 7/1978 | McDonald |
| 4,211,647 A | * | 7/1980 | Friedman et al. |
| 4,274,838 A | * | 6/1981 | Dale et al. |
| 4,401,441 A | * | 8/1983 | Chase |
| 4,429,043 A | | 1/1984 | Paton |
| 4,626,354 A | * | 12/1986 | Hoffman et al. |
| 5,525,229 A | * | 6/1996 | Shih |
| 5,670,047 A | * | 9/1997 | Burke |
| 5,962,307 A | * | 10/1999 | Holtzapple et al. |

FOREIGN PATENT DOCUMENTS

| | | |
|---|---|---|
| EP | 0 048 675 | 3/1982 |
| EP | 0 213 691 | 3/1987 |
| JP | 59 386 | 1/1984 |

\* cited by examiner

Primary Examiner—David A. Simmons
Assistant Examiner—Fred Prince
(74) Attorney, Agent, or Firm—BakerBotts, LLP

(57) ABSTRACT

The invention relates to a method for biologically treating a fluid sufficiently charged with organic materials, the method being performed in a tank and the fluid being:

Figure 1:
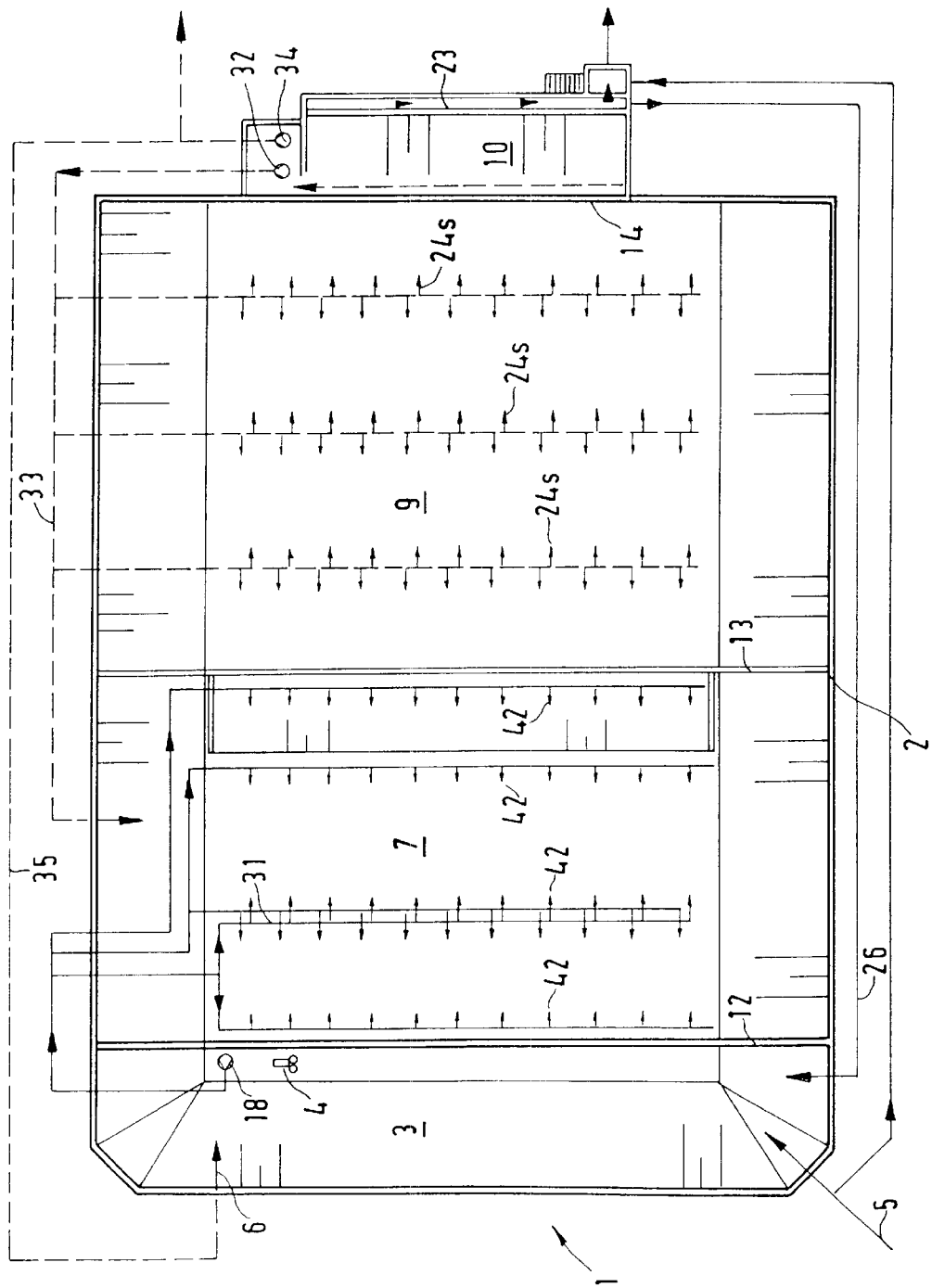

- first subjected to a mixing and acidifying step (A), subsequently
- in a heavy load step (B) during which activated-sludge is re-circulated and then in a light load step (C) subjected to anaerobic degradation whilst producing methane gas, and subsequently
- treated in a secondary sedimentation step (D) from where the sludge can also be re-circulated, and the biogas which is produced in the heavy load step (B) and the light load step (C) is collected.

26 Claims, 2 Drawing Sheets

METHOD AND DEVICE FOR BIOLOGICALLY TREATING A FLUID CHARGED WITH ORGANIC MATERIALS WHILST PRODUCING BIOGAS

The invention relates to a method and a device for biologically treating a fluid which is sufficiently charged with organic materials, in particular waste waters, under anaerobic conditions and whilst generating biogas.

Waste water is the term used for water which has been changed after household, commercial and industrial use, in particular water which is contaminated and flows and passes into the drainage channels.

The biological treatment of highly charged liquids or the purification of waste water also represents a feature for removing organic contaminants from liquids, which contaminants are contained in the liquids in a dissolved, colloidal or finely dispersed form, by microbial activity, i.e. aerobic and/or anaerobic degradation forming gas whilst building up new cell substances and sorption of bacterial floc, biological lawns or sludge granulate.

Generally, waste water is biologically purified in waste treatment plants using the same or similar procedures which occur when the waste water biologically cleans itself in running waters, however, in a technically more intensive manner. The anaerobic process likewise occurs naturally, e.g. at the bottom of flat, still waters.

The term 'anaerobic degradation' is understood to mean the conversion of organic substances by means of microorganisms whilst excluding oxygen. During the process of anaerobic degradation of organic substances biogas is produced, i.e. a gas mixture which consists approximately of 55 to 77% methane, approximately 24 to 44% carbon dioxide and traces of other ingredients.

Methods for biologically treating highly charged liquids under anaerobic conditions demand a relatively high specificity of the liquids. Such methods are suitable inter alia for highly charged liquids, in particular waste waters from the foodstuff industry, agriculture, mineral oil industry as well as from pulp making. In other words, they render it possible to treat many 'concentrates' but are generally incapable of providing a full purification or complete conversion.

A plant for the anaerobic treatment of waste water is known from the company Biothane Corporation (Company brochure, 7/92), which consists of a scaled, activated-sludge tank in which a group of separators are disposed in the upper region of the tank. In this plant, waste water is introduced via inlet orifices provided in the tank base into the activated-sludge tank and the treated waste water is discharged via a device provided in the upper region of the tank. This plant has inter alia the disadvantage that the reaction and secondary sedimentation regions are not spatially separate from each other and can therefore have a negative influence upon each other. For this reason the efficacy of the activated-sludge can also greatly reduce over a matter of time and problems can also occur when separating the sludge and the liquid.

Moreover, a plant for the anaerobic treatment of waste water is known from the company ADI Systems Inc. (company brochure, AS 043/11-94), which consists of a simple reaction tank which is upwardly sealed by means of a sheeting. This reaction tank is provided with a primary reaction region, the waste water being introduced from below into the sludge bed of the primary reaction region, a secondary reaction region and a secondary sedimentation region. Disposed between the primary and secondary reaction regions is a dipping wall which extends from the base of the reaction tank. The height of the dipping wall amounts to approximately ⅗ of the height of the reaction tank. Disposed between the secondary reaction region and the secondary sedimentation region are likewise dipping walls which extend downwards from the surface of the waste water. The height of these dipping walls amounts to approximately ⅓ of the height of the reaction tank. Moreover, the lower region of the secondary sedimentation region is provided with a discharge device for returning the sludge into the primary reaction region. One disadvantage of this plant resides in the fact that in particular the secondary reaction region is not sufficiently spatially separated from the secondary sedimentation region, which results in the efficacy of the sludge in the secondary reaction region considerably reducing over a matter of time. Also, the method performed in this plant does not take into consideration the different biological conditions in the two reaction regions. A further disadvantage of this method resides in the fact that the sludge in the second reaction region lies hardly used on the bottom.

The object of the invention was to provide a method and a device for biologically treating a fluid sufficiently charged with organic materials whilst producing biogas, the said method and device to guarantee an improved level of purification or degradation, an improved yield of methane gas, a considerably more favourable investment and a more reliable operation.

The advantages of the invention reside in the fact that owing to its compact structure with an integrated gas reservoir the device in accordance with the invention provides a considerable saving as far as space and costs are concerned (inter alia owing to savings made in insulating material) and furthermore is earthquake safe and is independent regarding settling.

According to the present invention the term 'fluids sufficiently charged with organic materials' is understood to mean blood, liquid manure and preferably waste waters, which comprise, for example, the following parameters: >ca. 2000 mg $BSB_5/l$ (in cooler climates) and >ca. 500 mg $BSB_5/l$ (in warmer climates).

Figure 2:
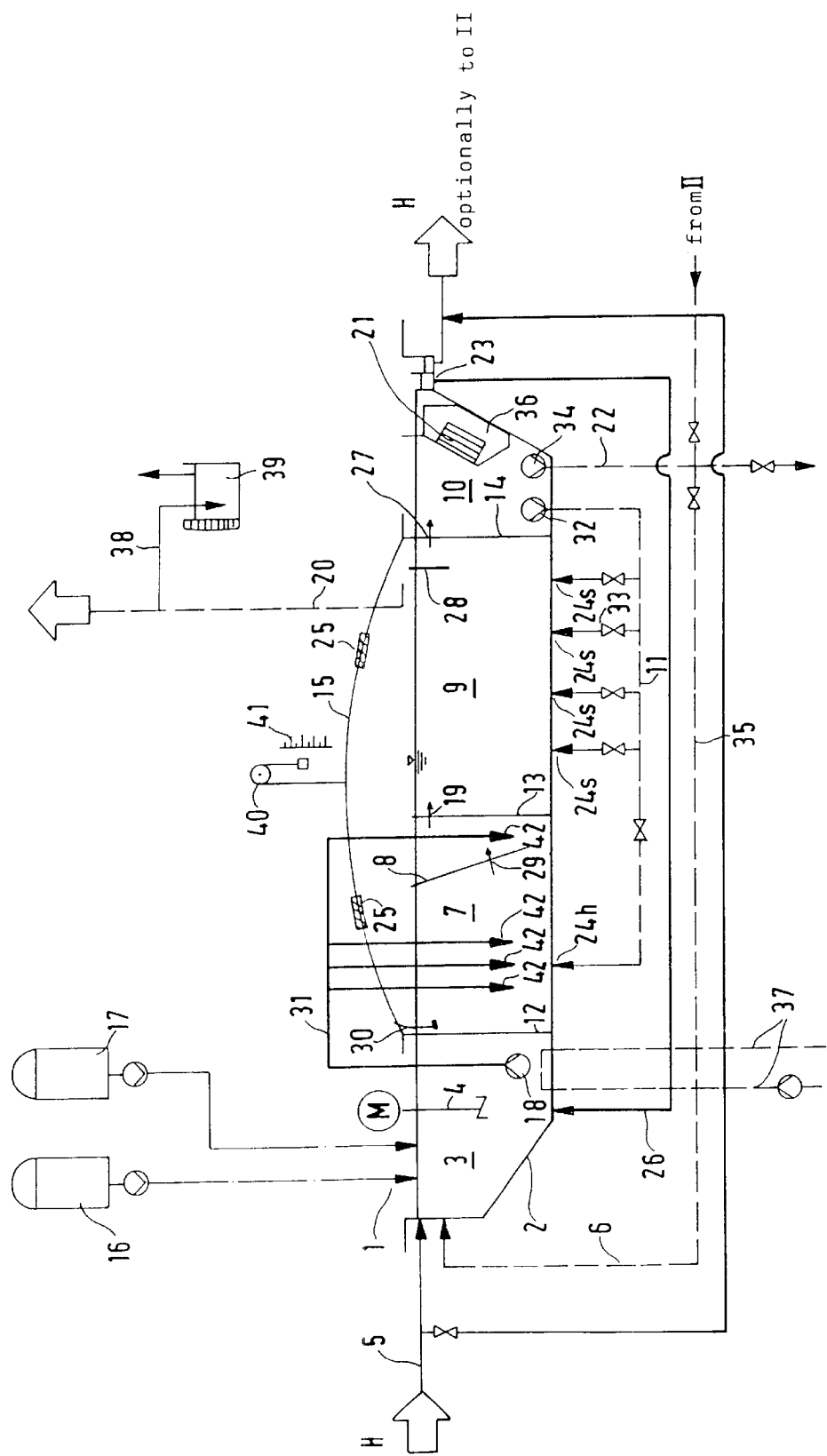

An exemplified embodiment of the invention is explained in detail hereinunder with reference to the drawings, in which:

FIG. 1 shows a schematic plan view of a device for biologically treating waste water, FIG. 2 shows a cross-sectional view of the device for biologically treating waste water as shown in FIG. 1.

The device 1 illustrated in FIGS. 1 and 2 for biologically treating waste water consists of a tank 2 in which are disposed, one behind the other in the direction of the main flow H of the water, a mixing and acidifying region 3, a heavy load region 7, a light load region 9 and a secondary sedimentation region 10.

The dimensions of the tank 2 are to a great extent variable and are determined by the individual characteristics of the waste water being supplied. The length of the tank 2 can be, for example, between 50 and 200 m and the width between 20 and 100 m. The tanks can be, for example, ca. 3 to 6 m deep.

The volumes of the individual regions are variable and can be adjusted to suit the treatment process by appropriately changing the positioning of the partition walls 12, 13 and 14. In the extreme case, the light load region 9 can be greatly reduced, so that it can be relocated in the part of the secondary sedimentation region 10. The volumes of the individual regions can be, for example, for brewery water, 285 m³ (mixing and acidifying region 3), 890 m³ (heavy load region 7), 1480 m³ (light load region 9) and 120 m³ (secondary sedimentation region 10).

The tank 2 is preferably sunk in the ground and constructed substantially in the manner of an earthwork. The base and the side walls of the tank 2 can be sealed with lengths of sealing material, e.g. HDPE.

The waste water passes via the supply device 5 first into the mixing and acidifying region 3. In this region both the temperature is measured (one or twice) and also the pH value of the waste water is measured, the pH-value where appropriate being compensated by means of additives via the device 16. Where necessary, an iron compound, e.g. an iron (IIX)-salt such as $FeClSo_4$ can be added via the charging device 17 to the waste water in the (or in the connection to the) mixing and acidifying region 3 to bind the sulphur. Moreover, the waste water in the mixing and acidifying region 3 can be mixed with the aid of an agitator 4. Activated-sludge which has been returned can also be directed via the supply device 6 into the mixing and acidifying region 3. Owing to the microbial activity the organic ingredients of the waste water are changed, more particularly acidified, in the mixing and acidifying region 3 under conditions which are not necessarily purely anaerobic. On the other hand, devices can be provided in the mixing and acidifying region 3 to aerate and circulate the waste water with air and oxygen (not illustrated), for control purposes.

At least one metering pump 18 having conduits 31 is provided preferably on the outlet side at the base of the mixing and acidifying region 3, the nozzle-like outlet orifices 42 of the said conduits issuing in the heavy load region 7. With the aid of this pump or pumps, especially as a function of the size of the heavy load region 7, varying quantities of mixture, e.g. approximately 40 to 60 litres of waste water per second are disposed in a swirling manner in the base region of the heavy load region 7 and supplied under pressure. The conduits 31 can also be switched for alternative use, in particular when the organic content is high, but first and foremost to save pump energy.

The methanogenic phase of the process of anaerobic degradation of the organic ingredients in. the waste water takes place in the heavy load region 7 (volume loading: approximately 25 to 40 kg $CSB/m^3_{BV} \times d$) and the light load region 9 (volume loading: approximately between 2 to 7 kg $CSB/m^3_{BV} \times d$). Both regions represent in each case a so-called activated-sludge bed (a specific biocenosis). The use of two independent and different stocks of bacteria (biocenosis) produces among other things an improved yield of methane gas. The activated-sludge beds are circulated for the heavy load region 7 alternatively or additionally towards the nozzles 42 in each case by the injection of (in a variable form) water, water-sludge mixture or returned sludge, wherein the latter can be directed via the discharge device 11 (consisting of at least one pump 32 and the conduit system 33) out of the secondary sedimentation region 10, through the nozzles 24h and/or 24s, which are provided on the base of the heavy load region 7 or on the base of the light load region 9. In order to support further the circulation it is possible to provide in the heavy load region 7 and in the light load region 9 gas-injecting devices (not illustrated) e.g. gassing chains for warm biogas which is dependent upon the climate or temperature, or agitators. The gas-injecting devices are charged with biogas which is drawn off from the gas reservoir extending over the heavy load region 7 and the light load region 9 and if necessary heated in a gas heater (not illustrated).

The activated-sludge or sludge granulate is re-circulated by means of a dipping wall 8, which comprises inlet orifices 29 disposed in the middle region and is provided in the region of the heavy load region 7 downstream with respect to the main flow direction H. The said inlet orifices extend from the surface almost as far as the base of the heavy load region 7, wherein the distance between the dipping wall 8 and the partition wall 13 reduces continuously as it approaches the base. Special gas-injecting nozzles provided in the base region and the kinetic energy (not illustrated), which is generally higher in the re-circulating region, ensure the re-circulating process. Special devices (not illustrated), e.g. paddles, can be disposed in the base region between the dipping wall 8 and the partition wall 13 for the purpose of releasing any blockages in the proximity of the base in the longitudinal region.

The still partially-charged waste water now passes via the outlet orifices 19 provided in the upper region of the partition wall 13 into the light load region 9. Should the waste water contain ingredients which do not easily degrade or additional dissolution effects are desired, then the dwell time of the waste water in the light load region 9 can be considerably longer than the dwell time in the heavy load region 7. Such effects are also achieved by means of the bacteria stock (biocenosis) which is adjusted here more to suit the further treatment or final treatment process. Simultaneously, further dissolution is achieved, which facilitates the subsequent mainly aerobic final treatment process.

The further advantage of providing a separate heavy load region and light load region resides in the fact that a good secondary sedimentation process is possible in a more convenient and efficient manner after a heavy load region. The person skilled in the art is aware of the great advantages of a good secondary sedimentation process.

In certain cases, it is advantageous to bypass the heavy load region 7 partially or completely (continuously or intermittently) with the aid of a bypass line provided (not illustrated) and to introduce the waste water directly into the light load region 9.

The sheeting 15 which forms the gas reservoir extends over the heavy load region 7 and the light load region 9. The edges of the said sheeting are provided with submerging tabs 30 which are provided with peripheral weights for the purpose of providing a perfect gas seal. The sheeting 15 is generally UV-stable and is equipped with variable weights 25 to maintain a constant pressure inside the gas reservoir. If these weights are designed as chambers which can be filled as desired with water, then the pressure inside the gas reservoir can be controlled. In cooler climatic regions the sheet 15 and/the entire tank 2 can be of a heat-insulated design.

The gas reservoir is provided with a device 20 for removing the biogas, by means of which device the biogas obtained is used for in-house heating purposes and for heating other buildings, for heating service water, to produce power and electricity and other application purposes.

The gas removal device 20 can be allocated a height-adjustment inlet container 39 as a pressure safety limiter via the conduit 38. Moreover, a circumferential cable 40 with a scale display 41 can be provided attached in a mechanical manner to the sheeting 15 to indicate the fill level.

The mixing and acidifying region 3 and the secondary sedimentation region 10 can be covered with a gas-tight sheeting (where necessary heat-insulated) to guarantee that the device in accordance with the invention operates 100% smell-free and to achieve a heat-insulating effect.

The waste water now passes from the light load region 9 via the outlet orifices 27 provided in the upper region of the partition wall 14 (in front of which the dipping wall 28 is disposed at a spaced disposition and in parallel) into the secondary sedimentation region 10. Owing to the light load region 9 and the secondary sedimentation region 10 being separated by the partition wall 14 and, in particular where the quantities of water are greater, by means of fixtures in the secondary sedimentation region 10, it is guaranteed that the treated waste water exits sludge-free from the secondary sedimentation region 10 and that the sludge discharged is considerably reduced or removed.

A lamella separator 21 which supports the treatment process is provided in the secondary sedimentation region 10 on the chamfered side wall 36, extending transversely with respect to the main flow direction H, of the tank in the immediate proximity of the outlet device 23 for the treated waste water, which outlet device is designed as an overflow device, e.g. as an overflow container.

In order to be able to operate the device continuously it is necessary to direct already treated waste water out of the outlet device 23 and via the supply device 26 preferably into the discharge region of the mixing and acidifying region 3 if the supply device 5 cannot be provided with sufficient fresh waste water. This generally occurs automatically owing to the appropriate vertical arrangement. Moreover, treated waste water can be directed out of the outlet device 23 and via the supply device 5 into the mixing and acidifying region 3 to dilute the fresh waste water, should the fresh waste water contain, for example, excessively high levels of toxic substances. By means of the same return devices it is possible for the outlet (not illustrated) to exchange heat with the mixing and acidifying region 3 or the supply device 5 to exchange heat or to avoid unnecessary heat loss.

Excess sludge can be directed out of the secondary sedimentation region 10 via the discharge device 22, which consists of a pump 34 provided on the base of the secondary sedimentation region 10 and the conduit system 35, into a sludge polder tank (not illustrated) or via the discharge device 22 and the supply device 6 into the mixing and acidifying region 3.

The level of treatment achieved by the device in accordance with the invention lies between 80 and 90%. However, owing to the two different stocks of bacteria (biocenosis), it can often be higher than 90%. In order to complete the treatment process, the waste water can be directed via the outlet device 23 into a subsequent, where necessary fixedly attached, device II for aerobic treatment the waste water. The said device II can consist of an activated region, an intermediate sedimentation region, a secondary aerating region and a secondary sedimentation region, or only the first two regions. The level of treatment achieved in such a combination of anaerobic and aerobic treatment processes is approximately 99.5%. The excess sludge is preferably directed from the secondary sedimentation region of the device II for aerobic treatment of the waste water via the supply device 6 or 26 into the mixing and acidifying region 3 in order to optimize the balance of excess sludge.

For an operation in cooler climatic regions the mixing and acidifying region 3, the heavy load region 7, the light load region 9 and where necessary the secondary sedimentation region 10 can be heat-insulated and in addition, as desired, the mixing and acidifying region 3, the heavy load region 7 and the light load region 9 can be provided with heating devices such as 37, e.g. with hot water.

What is claimed is:

1. Method for biologically treating a fluid which is sufficiently charged with organic materials, the method being performed in a tank and comprising:

first subjecting the fluid to a mixing and acidifying step (A), subsequently subjecting the fluid to anaerobic degradation while producing biogas in a heavy load step (B) during which activated-sludge is re-circulated and then in a light load step (C) and subsequently treating the fluid in a secondary sedimentation step (D) from which the sludge can also be re-circulated, and the biogas which is produced in the heavy load step (B) and the light load step (C) is collected.

2. Method according to claim 1 wherein the fluid is a waste water.

3. Method according to claim 2 wherein the waste water is agitated in the mixing and acidifying step (A).

4. Method according to claim 3 wherein the waste water is mixed in the mixing and acidifying step (A) with re-circulated activated-sludge.

5. Method according to claim 2 wherein the pH-value of the waste water is mixed is adjusted in the mixing and acidifying step (A).

6. Method according to claim 2 wherein an iron-compound is added to the waste water in the mixing and acidifying step (A).

7. Method according to claim 2 wherein during the secondary sedimentation step (D) settled sludge is returned to the heavy load step (B) and/or the light load step (C).

8. Method according to claim 2 wherein after passing through the steps (A) to (D) the waste water is at least partially returned to the mixing and acidifying step (A).

9. Method according to claim 2 wherein after passing through the steps (A) to (D) the waste water is also treated under aerobic conditions.

10. Method according to claim 9 wherein the aerobic treatment includes an activated step, an intermediate sedimentation step, a secondary aeration step and a secondary sedimentation step.

11. Device for biologically treating a fluid sufficiently charged with organic materials comprising:

a tank, in which are disposed in the main flow direction of the fluid one behind the other;

a mixing and acidifying region, to which is connected a supply device for the fluid, a heavy load region for the anaerobic degradation of the fluid whilst producing biogas, this region being provided with a device for recirculating the activated sludge, a light load region for the further anaerobic degradation of the fluid whilst producing biogas, and a secondary sedimentation region which is provided with at least one discharge device returning the sludge, wherein the mixing and acidifying region, heavy load region, light load region and secondary sedimentation region are separated by partition walls, and a gas-tight sheeting which extends over the heavy load region and the light load region and forms a gas reservoir.

12. Device according to claim 11 wherein the mixing and acidifying region is equipped with an agitator.

13. Device according to claim 11 wherein the mixing and acidifying region is connected to a supply device for re-circulating the activated sludge.

14. Device according to claim 11 wherein the mixing and acidifying region is connected to a device for the purpose of adjusting the pH-value.

15. Device according to claim 11 wherein the mixing and acidifying region is connected to a charging device for an iron compound.

16. Device according to claim 11 wherein the mixing and acidifying region is provided with at least one metering pump, the inlet of which is connected to the mixing and acidifying region and the outlet of which is connected to the heavy load region.

17. Device according to claim 11 wherein the device for recirculating the sludge is formed as a dipping wall.

18. Device according to claim 11 wherein the heavy load region is connected to one or a plurality of discharge devices for re-circulating the sludge.

19. Device according to claim 11 wherein in the heavy load region there is disposed at least one gas-injecting device for, if necessary heated, biogas.

20. Device according to claim 11 wherein the partition wall comprises outlet orifices in the upper region.

21. Device according to claim 11 wherein the light load region is connected to one or a plurality of discharge devices for re-circulating the sludge.

22. Device according to claim 11 wherein the light load region is provided with at least one gas-injecting device for, if necessary heated, biogas.

23. Device according to claim 11 wherein the secondary sedimentation region is equipped with a lamnella separator.

24. Device according to claim 11 wherein the secondary sedimentation region is connected to at least one discharge device for excess sludge.

25. Device according to claim 11 wherein a discharge device for the waste water is connected to the secondary sedimentation region.

26. Device according to claim 11 wherein the tank is sunk in the ground.

* * * * *